(12) United States Patent
Dido et al.

(10) Patent No.: US 7,469,587 B2
(45) Date of Patent: Dec. 30, 2008

(54) THERMAL CELL SYSTEM FOR MEASURING ACCELERATION

(75) Inventors: Jérôme Dido, Paris (FR); Pierre Loisel, Courdimanche (FR); Alain Renault, Pontoise (FR); Philippe Combette, Castelnau le Lez (FR); Johann Courteaud, La Possession (FR); Alain Giani, Le Cres (FR)

(73) Assignee: Sagem Defense Securite, Paris (FR)

( * ) Notice: Subject to any disclaimer, the term of this patent is extended or adjusted under 35 U.S.C. 154(b) by 183 days.

(21) Appl. No.: 11/410,971

(22) Filed: Apr. 26, 2006

(65) Prior Publication Data
US 2006/0260399 A1    Nov. 23, 2006

(30) Foreign Application Priority Data
May 17, 2005    (FR) .................................... 05 04913

(51) Int. Cl.
*G01P 15/00* (2006.01)
(52) U.S. Cl. .............. 73/514.09; 73/514.05; 73/504.05; 73/497; 73/523; 73/531
(58) Field of Classification Search ........... 73/514.09, 73/514.05, 504.05, 497, 521, 531, 551, 488
See application file for complete search history.

(56) References Cited
U.S. PATENT DOCUMENTS

| 4,611,491 | A | * | 9/1986 | Brown et al. ............. 73/514.21 |
| 5,581,034 | A | | 12/1996 | Dao et al. |
| 5,604,309 | A | * | 2/1997 | Ward ........................... 73/488 |
| 5,719,333 | A | * | 2/1998 | Hosoi et al. .............. 73/514.05 |
| 6,930,487 | B2 | * | 8/2005 | North, Jr. ..................... 324/457 |
| 7,080,553 | B2 | * | 7/2006 | Luo et al. ................. 73/514.05 |

OTHER PUBLICATIONS

Mailly et al., Sensors and Actuators, vol. 103, No. 3, Feb. 15, 2003, pp. 359-363.

* cited by examiner

*Primary Examiner*—Hezron Williams
*Assistant Examiner*—Gunnar J Gissel
(74) *Attorney, Agent, or Firm*—Muncy, Geissler, Olds, & Lowe PLLC

(57) ABSTRACT

The acceleration measurement system has a first thermal cell optimized in sensitivity and a second thermal cell optimized in passband, which cells are connected to inputs of a servo-control loop including an amplifier presenting gain that varies as a function of input signal frequency.

5 Claims, 1 Drawing Sheet

THERMAL CELL SYSTEM FOR MEASURING ACCELERATION

BACKGROUND OF THE INVENTION

1. Field of the Invention

The present invention relates to a thermal cell system for measuring acceleration.

2. Brief Discussion of the Related Art

U.S. Pat. No. 5,581,034 in particular discloses a thermal accelerometer comprising a gas-filled enclosure in which there are located a central heater strand with detector strands extending on either side thereof and presenting resistivity that is temperature-sensitive. The detector strands are mounted in a Wheatstone bridge together with unchanging resistances. The Wheatstone bridge is connected to a measurement circuit that delivers an electrical signal representative of a temperature difference between the detector strands. The temperature difference is itself representative of the acceleration to which the accelerometer is subjected.

The measurement characteristics of accelerometers of that type depend in particular on the nature of the gas used for filling the enclosure. In particular, a thermal accelerometer having an enclosure filled with a heavy gas presents high sensitivity but a narrow passband (typically 10 hertz (Hz)), whereas a thermal accelerometer in which the enclosure is filled with a light gas presents much lower sensitivity, but presents a passband that is much wider (typically 100 Hz).

In present measurement systems, it is therefore necessary to achieve a compromise between the sensitivity and the passband of the accelerometer used.

SUMMARY OF THE INVENTION

An object of the invention is to provide a thermal cell acceleration measurement system presenting both good sensitivity and a wide passband.

The invention provides an acceleration measurement system comprising two thermal cells having differing measurement characteristics and connected to deliver input signals to a servo-control loop comprising an amplifier with gain that is variable as a function of input signal frequency.

Preferably, the acceleration measurement system comprises a first cell that is optimized in sensitivity and connected to a positive input of a subtracter upstream from the amplifier, and a second cell that is optimized in passband and that is connected to an adder downstream from the amplifier.

Thus, the error that results from the inaccuracy at a high frequency of the sensitivity-optimized cell is corrected by the signal coming from the cell with a wide passband, whereas at low frequency the error of the bassband-optimized signal is corrected by the sensitivity-optimized signal so that the signal obtained from the output of the servo-control loop is a signal that is optimized both in sensitivity and in bassband.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
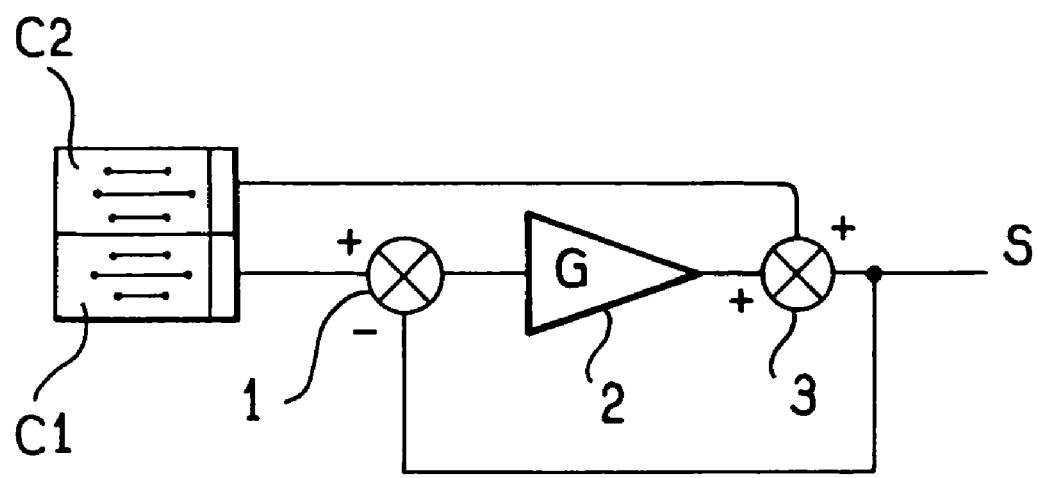
FIG. 1 is a schematic diagram of the measurement system of the invention.

With reference to FIG. 1, the acceleration measurement system of the invention comprises a first cell C1 that is optimized in sensitivity, e.g. a cell having an enclosure filled with carbon dioxide gas so that the cell presents high sensitivity but a passband that is limited to 10 Hz, and a second cell C2 that is optimized in passband, e.g. a cell in which the enclosure is filled with helium and for which the passband reaches a frequency of 100 Hz. The first cell C1 delivers a measurement signal that is applied to the positive input of a subtracter 1 whose output is connected to an amplifier 2 presenting gain G that varies as a function of input signal frequency F. The output from the amplifier 2 is connected to one of the inputs of an adder 3 whose other input receives the measurement signal delivered by the second cell C2. The output from the adder 3 is connected to the negative input of the subtracter 1 so as to form a servo-control loop that delivers an output signal S.

Figure 2:
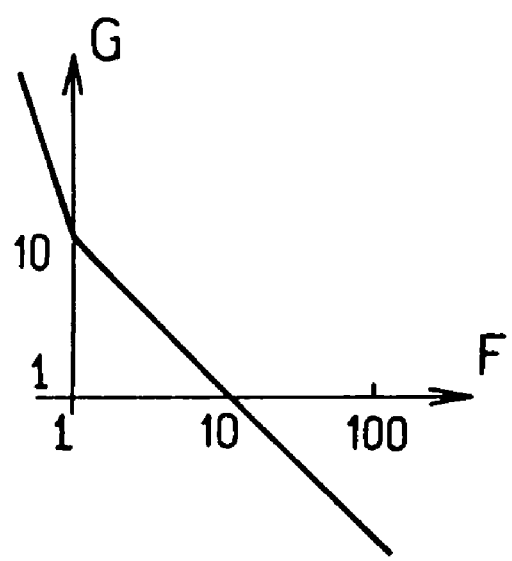
FIG. 2 is a plot of a preferred gain curve for implementing the measurement system of the invention.

FIG. 2 plots the gain of the amplifier 2 as a function of input signal frequency, using a graph with logarithmic scales, the gain G preferably being linear with a slope of −1 for frequencies greater than 1 Hz and a slope of −2 for frequencies less than 1 Hz in order to minimize zero error for low frequencies. For good stability of the servo-control loop, the gain also has a value of 1 at a frequency of 10 Hz, which is equal to the maximum frequency of the sensitivity-optimized first cell C1.

The invention is not limited to the embodiment described and variant embodiments can be provided without going beyond the ambit of the invention as defined by the claims. In particular, although the acceleration measurement system is shown as having only two cells, it is possible to provide a measurement system having cells that are optimized for characteristics other than those described and to perform a cascade of servo-control operations as a function of the performance desired for the system. It is also possible to use a plurality of identical servo-control loops in order to provide measurement redundancy, in particular for guided weapons that are stored over long periods of time and then used without the acceleration measurement system being subjected to thorough testing.

Although the invention is described with reference to an amplifier presenting linear variable gain, it is possible to use an amplifier in which the gain is not linear, however the gain should nevertheless preferably be generally decreasing as a function of increasing input signal frequency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An acceleration measurement system comprising two thermal cells having differing measurement characteristics, including a first cell optimized in sensitivity and a second cell optimized in passband, and connected to deliver input signals to a servo-control loop comprising an amplifier with gain that is variable as a function of input signal frequency, wherein the sensitivity-optimized cell is connected to a positive input of a subtracter upstream from the amplifier, and the passband-optimized cell is connected to an adder downstream from the amplifier.

2. An acceleration measurement system according to claim 1, wherein the gain decreases as a function of input signal frequency.

3. An acceleration measurement system according to claim 1, wherein the gain decreases as a function of input signal frequency, and wherein the gain has a value of 1 for a maximum frequency of the sensitivity-optimized cell.

4. An acceleration measurement system according to claim 1, wherein the gain is linear with a slope of −1 for frequencies greater than 1 Hz.

5. An acceleration measurement system according to claim 4, wherein the slope is −2 for a frequency less than 1 Hz.

* * * * *